United States Patent [19]

Froehlich et al.

[11] 3,870,697
[45] Mar. 11, 1975

[54] TRISAZO DYESTUFFS CONTAINING TWO CARBOXAMIDE GROUPS

[75] Inventors: Alfred Froehlich, Marly-Le-Grand; Hansrolf Loeffel, Bern, both of Switzerland

[73] Assignee: Ciba-Geigy AG, Basel, Switzerland

[22] Filed: Oct. 2, 1972

[21] Appl. No.: 293,964

Related U.S. Application Data

[63] Continuation of Ser. No. 798,792, Feb. 12, 1969, abandoned.

[30] Foreign Application Priority Data

Feb. 15, 1968 Switzerland................ 2253/68

[52] U.S. Cl.............. 260/173, 96/99, 260/152, 260/155, 260/156, 260/157, 260/159, 260/169, 260/173, 260/194, 260/196, 260/207

[51] Int. Cl............................................ C09b 43/12

[58] Field of Search.................................. 260/173

[56] References Cited
UNITED STATES PATENTS 2,659,721  11/1953  Bossard et al. .............. 260/173
2,727,887  12/1955  Bossard et al. .............. 260/173

FOREIGN PATENTS OR APPLICATIONS 1,464,177  12/1966  France........................ 260/173

Primary Examiner—Henry R. Jiles
Assistant Examiner—Robert W. Ramsuer
Attorney, Agent, or Firm—Joseph G. Kolodny; Edward McC. Roberts; Prabodh I. Almaula

[57] ABSTRACT

This invention relates to new trisazo dyestuffs containing two acylamino groups and their use for the production of photographic materials, especially as image dyestuffs for the silver dyestuffs bleaching process. The trisazo dyestuffs of the invention are those of the formula

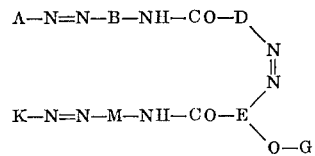

wherein A, K, B and M each denotes an aromatic residue, D and E each denotes an aromatic or heterocyclic residue and G denotes a hydrogen atom or an organic residue, the residues D and E-O-G being different from one another and the residues A-N=N-B- and/or K-N=N-M- containing groups which impart solubility in water.

8 Claims, No Drawings

TRISAZO DYESTUFFS CONTAINING TWO CARBOXAMIDE GROUPS

This is a continuation, of application Ser. No. 798,792, filed Feb. 12, 1969, now abandoned.

The present invention provides new trisazo dyestuffs of formula (1) 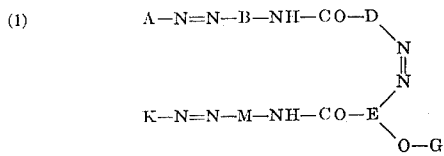

wherein A, K, B and M each denotes an aromatic residue, D and E each denotes an aromatic or heterocyclic residue and G denotes a hydrogen atom or an organaic residue, the residues D and E—O—G being different from one another and the residues A—N=N—B— and/or K—N=N—M— containing groups which impart solubility in water.

Particularly valuable trisazo dyestuffs are those of formula (2) 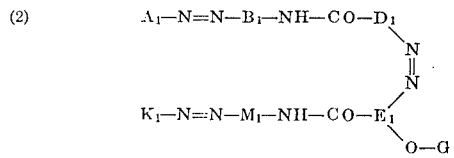

wherein $A_1$, $K_1$, $B_1$ and $M_1$ each denotes an aromatic residue containing one or two rings, $D_1$ and $E_1$ each denotes an aromatic residue containing one or two rings or a heterocyclic residue having five or six ring members and G denotes a hydrogen atom or an organic residue, the residues $D_1$ and $E_1$—O—G being different from one another and the residues $A_1$—N=N—$B_1$— and/or $K_1$—N=N—$M_1$— containing groups which impart solubility in water.

Trisazo dyestuffs of formula (3) 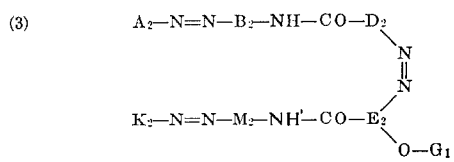

are of particular interest, wherein $A_2$, $K_2$, $B_2$ and $M_2$ each denotes a benzene or naphthalene residue, $D_2$ denotes a benzene or naphthalene residue or a heterocyclic residue having five or six ring members, especially a triazole residue, $E_2$ denotes a benzene or naphthalene residue and $G_1$ denotes a hydrogen atom or an alkyl group containing one to five carbon atoms, and wherein $A_2$ and $K_2$ may each contain one to three acidic groups imparting solubility in water, $B_2$ and $M_2$ may each contain one acidic group imparting solubility in water, and $D_2$ and $E_2$ may each contain halogen atoms, alkyl, alkoxy or phenyl groups, the residue —O—$G_1$ being bound to the azo group in the 1,2- or 1,4-position and the residues $D_2$ and $E_2$—O—$G_1$ being different from one another.

These trisazo dyestuffs also include those derived from two identical aminoazo dyestuff molecules, namely dyestuffs of formula (4) 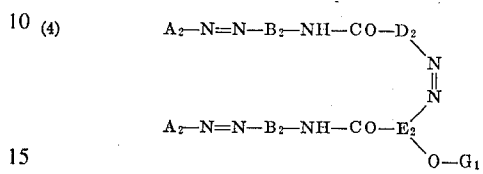

wherein $A_2$, $B_2$, $D_2$, $E_2$ and $G_1$ have the abovementioned significance.

Yellow trisazo dyestuffs of formulae (1) to (4) preferably correspond to the formula (5) 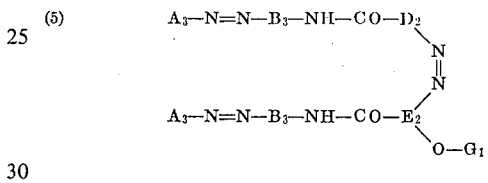

wherein $A_3$ denotes a benzene or naphthalene residue which may be substituted by halogen atoms, alkyl, alkoxy or nitro groups and contains one to three sulphonic acid groups, $B_3$ denotes a benzene residue which may be substituted by at most two halogen atoms or alkyl, alkoxy, hydroxyalkoxy, alkoxyalkoxy, acylamino, carboxyacylamino (for example a residue of formula HOOC—$CH_2$—$CH_2$—CO—NH—), carboxyalkyl, carboxy or phenoxy groups or denotes a naphthalene residue, and wherein $D_2$, $E_2$ and $G_1$ have the abovementioned significance.

The residues A, K, $A_1$, $K_1$, $A_2$, $K_2$ and $A_3$ of formulae (1) to (5) may be for example derived from the following amines: 2-aminonaphthalene-4,8-disulphonic acid, 2-amino-6-nitronaphthalene-4,8-disulphonic acid, 2-aminonaphthalene-5,7-disulphonic acid, 1-aminonaphthalene-3,6-disulphonic acid, 2-aminonaphthalene-4,6,8-trisulphonic acid, 1-aminobenzene-3,5-dicarboxylic acid, 1-aminobenzene-2-sulphonic acid and 1-aminobenzene-2,5-disulphonic acid.

The residues B, M, $B_1$, $M_1$, $B_2$, $M_2$ and $B_3$ of formulae (1) to (5) may for example be derived from the following amines: aminobenzene, 1-amino-2- or -3-methylbenzene, 1-amino-2,5- or -2,6-dimethylbenzene, 1-amino-2- or -3-methoxybenzene, 1-amino-2-ethoxybenzene, 1-amino-2-β-hydroxyethoxybenzene, 1-amino-2-β-methoxyethoxy-5-methylbenzene, 1amino-3-acetylaminobenzene, 1-amino-3-n-butyrylaminobenzene, 1-amino-3-propionylaminobenzene, 1-amino-3-isobutyrylaminobenzene, 1-amino-3-acetylamino-6-methylbenzene, 1-amino-3-proprionylamino-6-methylbenzene, 1-amino-3-n-butyrylamino-6-methylbenzene, 1-amino-3-isobutyrylamino-6-methylbenzene, 1-amino-2-acetylamino-5- methylbenzene, 1-amino-2-propionylamino-5-methylbenzene, 1-amino-2-n-butyrylamino-5-methylbenzene, 1-amino-2-isobutyrlamino-5-methylbenzene, 1-amino-2-methoxy-5-methylbenzene, 1-amino-2-methyl-5-methoxybenzene, 1-amino-3-chlorobenzene, 1-amino-2chloro-5-methoxybenzene, 1-amino-2-methoxy-5-chlorobenzene, 1-amino-3-glutaroylaminobenzene, 1-amino-3-succinoylaminobenzene, 1-amino-3-fumaroylaminobenzene, 1-amino-2,5-dimethoxybenzene, 1-amino-2,5-diethoxybenzene, 1-amino-2,5-diacetylaminobenzene, 1-aminonaphthalene, 2-aminonaphthalene-7-sulphonic acid, 1-aminobenzene-2,5-dioxyacetic acid, 1-amino-2-methoxy-5-phenoxybenzene and N-3-amino-4-methylphenyl-urea.

The trisazo dyestuffs which are derived from two identical aminoazo dyestuff molecules include dyestuffs of formula

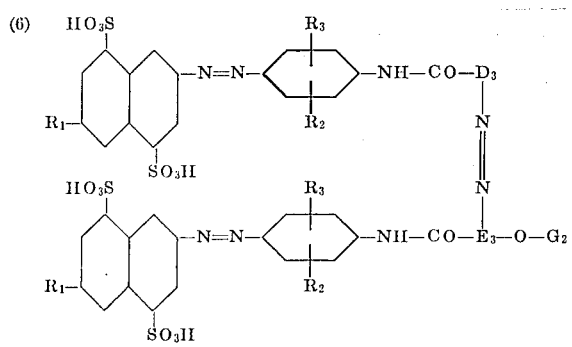

wherein $R_1$ denotes a hydrogen atom, a halogen atom, a nitro group or a sulphonic acid group, $R_2$ denotes a hydrogen atom, a halogen atom, or an alkyl, alkoxy, hydroxyalkoxy or alkoxyalkoxy group having in each case one to five carbon atoms in the alkyl residue, a phenoxy, hydroxyacetic acid, acetic acid or acylamino group wherein acyl represents the residue of an aliphatic carboxylic acid having one to five carbon atoms or of a benzene carboxylic, pyridine carboxylic, furane carboxylic or thiophene carboxylic acid which may be substituted, or a carboxyacylamino group which is derived from an aliphatic discarboxylic acid having one to five carbon atoms or from a benzene dicarboxylic, pyridine dicarboxylic, furane dicarboxylic or thiophene dicarboxylic acid which may be substituted, $R_3$ denotes a hydrogen atom, or an alkyl, alkoxy or acylamino group, wherein acyl has the significance given for the residue $R_2$, $D_3$ denotes a phenylene, naphthylene, toluylene, anisoylene, chlorophenylene, furoylene, thienylene, imidazolylene, quinolylene or triazolylene residue, $E_3$ denotes a phenylene, naphthylene, toluylene, anisoylene, quinolylene or pyrazolonephenylene residue and $G_2$ denotes a hydrogen atom or a methyl or ethyl group, the residues $D_3$ and $E_3$—$OG_2$ being different from one another.

Preferred yellow dyestuffs for example correspond to the formula

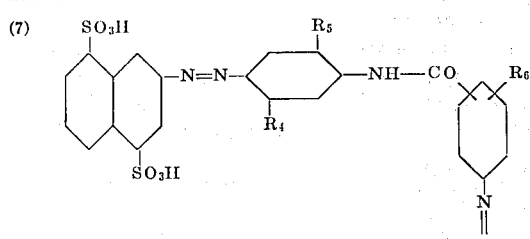

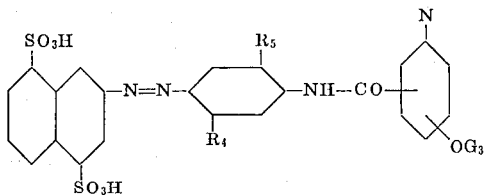

wherein $R_4$ denotes a chlorine atom, or a methyl, methoxy or acetylamino group, $R_5$ denotes a hydrogen atom, or a methyl, methoxy, ethoxy or hydroxyethoxy group, $R_6$ denotes a hydrogen atom or a methoxy group and $G_3$ denotes a methyl group, the residues of formulae

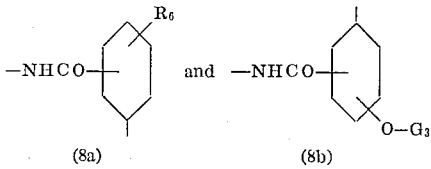

being different from one another, the —NHCO— groups always being bound by their —CO— residue in the 3- or 4-position and the $G_3$—O— residue being bound to the benzene residue in the 2- or 4-position to the azo bridge.

Amongst these dyestuffs, those of formula

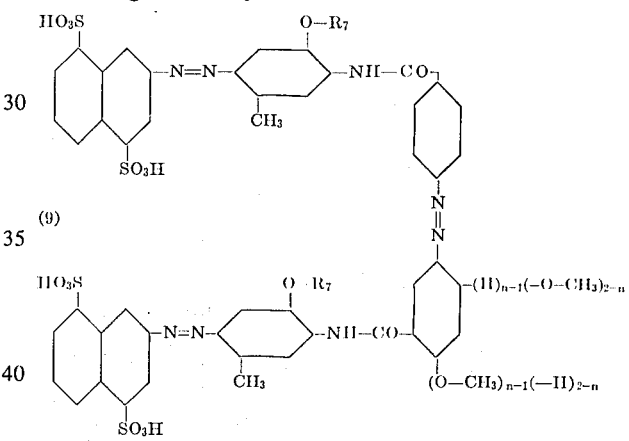

are particularly suitable, wherein $R_7$ denotes a methyl or hydroxyethyl group and $n$ denotes 1 or 2.

The yellow dyestuffs of formula (1) may all be manufactured according to the same processes. An advantageous process is characterised in that compounds of formulae (10a) A—N=N—B—NH$_2$ and/or (10b) K—N=N—M—NH$_2$ wherein A, B, K and M have the above significance, are condensed with dicarboxylic acid dihalides of formula

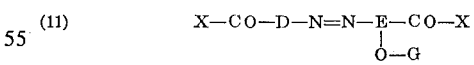

wherein X denotes a halogen atom and D, E and G have the above significance.

The residues D, $D_1$, $D_2$ and $D_3$ may for example be derived from the following diazo components: 3-aminobenzene-1-carboxylic acid, 4-aminobenzene-1-carboxylic acid, 4-amino-3-methylbenzene-1-carboxylic acid, 3-amino-4-methylbenzene-1-carboxylic acid, 3-amino-4-methoxybenzene-1-carboxylic acid, 3-amino-4-chlorobenzene-1-carboxylic acid, 5-amino-2-chlorobenzene-1-carboxylic acid, 4-amino-2-chlorobenzene-1-carboxylic acid, 2-aminothiophene-5-carboxylic acid, 2-amino-5-furane-carboxylic acid, 5-amino-1,2,4- triazole-3-carboxylic acid, 8-aminoquinaldine-3-carboxylic acid, 8-methyl-7-aminoquinaldine-5-carboxylic acid, 1-(3'-amino-5'-carboxy)-phenyl-3-methyl-5-pyrazolone, 4-amino-1-naphthoic acid, 5-amino-1-naphthoic acid and 5-amino-2-naphthoic acid.

The residues E, $E_1$, $E_2$ and $E_3$ may for example be derived from the following coupling components: 1-hydroxybenzene-2-carboxylic acid, 1-hydroxybenzene-3-carboxylic acid, 1-hydroxybenzene-4-carboxylic acid, 1-hydroxy-4-methylbenzene-2-carboxylic acid, 1-hydroxy-5-methylbenzene-2-carboxylic acid, 1-hydroxy-6-methylbenzene-2-carboxylic acid, 1-hydroxy-4-chlorobenzene-2-carboxylic acid, 1-hydroxy-5-methoxybenzene-2-carboxylic acid, 1-hydroxynaphthalene-2-carboxylic acid, 1-phenyl-3-carbethoxy-5-pyrazolone-3'-carboxylic acid, 5-hydroxyquinoline-6-carboxylic acid, 6-hydroxyquinoline-4-carboxylic acid, 5-hydroxypyridine-2-carboxylic acid, 1,2- or 2,3-hydroxynaphthoic acid and 5-chlorosalicylic acid.

The condensation may be effected according to known methods and may be advantageously carried out in a polar solvent for example water or especially a polar organic solvent for example dimethylformamide, diethylacetamide or N-methylpyrrolidone. It is also advantageous to carry out the condensation in the presence of acid-binding reagents for example tertiary amines or alkali metal carbonates. The condensation may also be carried out in solvents which themselves act as acid-binding agents for example pyridine or N-methylpyrrolidone already mentioned.

The aminoazo dyestuffs of formulae (10a) and (10b) may be manufactured according to known methods for example by combining a diazo compound of an amino of formula A—$NH_2$ or K—$NH_2$, wherein A and K have the significance mentioned, advantageously in an acid medium, with a monoamine of formula H—B—$NH_2$ or H—M—$NH_2$ capable of coupling, wherein B and M have the above significance.

The dicarboxylic acid dihalides of formula (11) may be manufactured by diazotisation of an aminobenzene carboxylic or aminonaphthalene carboxylic acid or of an aminoheterocyclic carboxylic acid or esters thereof, and coupling with a compound of formula H—E, wherein E has the above-mentioned significance, if desired followed by alkylation of a hydroxyl group in the o- and p-position in the residue E, and reaction of the azobenzene dicarboxylic acid thus obtained with a halogenating agent, for example phosphorus pentachloride, phosphorus trichloride, thionyl chloride or phosgene, if desired in the presence of an ineert solvent with or without the addition of, for example, pyridine or dimethylformamide as catalyst.

Another process for the manufacture of trisazo dyestuffs of formula (1) is characterised in that a diazonium compound of an amine of formula

(12) 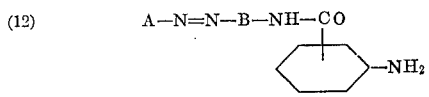

wherein A and B have the significance mentioned above is coupled with a compound of formula

(13) 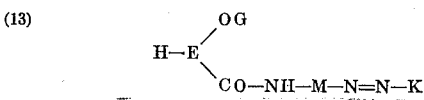

wherein E, M and K have the significance mentioned above and G represents a hydrogen atom.

The diazonium compounds of the amines of formula (12) can be obtained in various ways. Either a carboxylic acid halide of formula

(14) 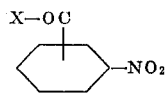

wherein X has the significance already mentioned, is condensed with a compound of formula (10a) and/or (10b), the nitro group reduced to the amino group and diazotised, or a carboxylic acid halide of formula

(15) 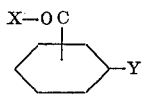

wherein X has the significance already mentioned and Y represents the residue —NH—Z or —N=Z, wherein Z represents a removable protective group, is condensed with a compound of formula (10a) and/or (10b), the protective group split off and the amino group diazotised. Suitable protective groups are for example phthaloyl, carbalkoxy, carbophenyloxy, carbobenzoxy or triphenylmethyl groups.

The compounds of formula (15) may be advantageously manufactured by reacting the derivatives of the aminocarboxylic acids with the dicarboxylic acid anhydrides or the reactive halogen compounds of the protective groups in an aqueous-alkaline medium or in an inert solvent, if desired in the presence of compounds which add hydrogen halides for example pyridine or triethylamine. After saponification and conversion to the carboxylic acid halide, preferably the chloride or bromide, the reaction with the aminoazo dyestuffs of formula (10a) and/or 10b) is then carried out in the usual manner. The manufacture of products having protective groups and the splitting off of the protective groups under the appropriate conditions are known from protein chemistry.

As examples of compounds from which suitable carboxylic acids and their derivatives may be derived, the compounds of the following formulae for example may be mentioned:

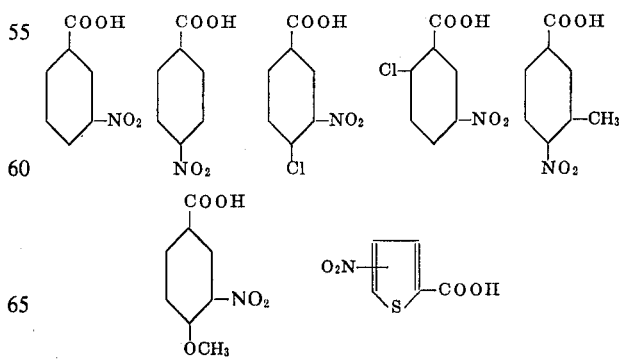

Using these manufacturing processes, three azo dyestuff residues which may be different from one another can be combined together in one melecule in a simple manner.

The trisazo dyestuffs of formula (1) can be used for various purposes, for example in the production of photographic materials and particularly advantageously as image dyestuffs for the silver dyestuff bleaching process. Valuable photographic materials which contain at least one layer having a dyestuff of formula (1) on a support can accordingly by manufactured in the usual manner by known methods.

In particular, the trisazo dyestuffs may be present in a multi-layer material which on a layer support contains a layer which is dyed with a greenish-blue dyestuff and is selectively sensitive to red, over this a magenta-coloured layer which is selectively sensitive to green and finally a yellow-coloured layer which is selectively sensitive to blue.

The trisazo dyestuffs of formula (1) can be used in the various layers.

The dyestuffs of formulae (5) (6), (7) and (8) are particularly suitable for the layer which is sensitive to blue in a silver dyestuff bleaching process.

The dyestuffs of formula (1) may also be incorporated into an auxiliary layer or especially into a layer adjacent to the light-sensitive layer.

The dyestuffs of formula (1) are very diffusion-resistant in the usual layers. They do not tend to change to an opalescent to cloudy form in gelatine layers on drying and storage, and they can be readily reduced in the bleaching bath to form harmless and/or easily washed-out decomposition products.

The dyestuffs of formula (1) are distinguished by particularly high colour strength and purity of shade. Grey shades which appear neutral to the eye over the entire density range can be produced with them, for example by combining a yellow dyestuff of formula (7) or (9) with one each of a suitable magenta and cyan dyestuff.

Compared to other trisazo dyestuffs, the dyestuffs of formula (1) are quite exceptionally distinguished by their good solubility and compatibility with cations, especially calcium ions. They are nevertheless extraordinarily diffusion-resistant over a pH range of 0-11.

In many cases it is particularly difficult to displace the absorption of yellow dyestuffs by small amounts, for example by 5 nm towards longer wavelengths, or to flatten an excessively steep flank of the absorption curve, particularly in the direction of longer wavelengths, as can under certain circumstances be desirable to produce a neutral grey shade, when appropriately combining all three dyestuffs, over all density ranges.

The present invention therefore also provides photographic material, especially for the silver dyestuff bleaching process, which contains on a support, at least one layer having a dyestuff of one of formulae (1) to (7) and (9).

Percentages given in the manufacturing examples which follow are percentages by weight.

EXAMPLE 1

1.1. 2-Aminonaphthalene-4,8-disulphonic acid is diazotised in the usual manner and coupled with 2-methoxy-5-methylaniline.

1.2. p-Aminobenzoic acid ethyl ester is diazotised in the usual manner and coupled with salicylic acid methyl ester. A yellow azo dyestuff is obtained which melts at 151° C after recrystallisation from acetone.

The hydroxyl group of this dyestuff is methylated in the usual manner with dimethyl sulphate in acetone in the presence of potassium hydroxide. The resulting methylation product melts at 140° C. 4-Methoxyazobenzene-3,4'-dicarboxylic acid of melting point 275° to 278° C is obtained by saponification of the two ester groups. 400 g of this acid are dissolved in 400 ml of toluene and 63 ml of dimethylformamide at 80° C, mixed at room temperature with 245 ml of thionyl chloride, and the temperature is raised to 90° C in 1 hour. The mixture is stirred for a further 2 hours at 90° C, filtered hot and the filtrate slowly allowed to cool to 0° C. The mixture is filtered and the residue washed three times with 300 ml of petroleum ether each time.

430 g of yellow needles of melting point 138° C are obtained.

1.3. 5.40 g of the product manufactured according to 1.1. are dissolved in 44 ml of N-methylpyrrolidone at 120° C. The mixture is then cooled to 80° C, 1.50 ml of dry pyridine are added and 2.50 g of the product manufactured according to 1.2. are introduced whilst stirring. The addition of the product according to 1.2. is continued until no further product according to 1.1. can be detected chromatographically in the reaction mixture. The stirrer and the heating are then switched off and the mixture is slowly allowed to cool to room temperature. The yellow crystals which have separated are filtered and washed with 2.00 ml of N-methylpyrrolidone. The residue is boiled with 50 ml of methanol for 1 hour whilst stirring, filtered and washed three times with 2.50 ml of methanol each time. The residue is then boiled for one hour with 40 ml of methanol and 6.00 ml of 20 percent potassium acetate solution whilst stirring, filtered hot, rinsed four times with 4.00 ml of methanol each time and dried at 60° C in vacuo. 4.75 g of the dyestuff A of formula

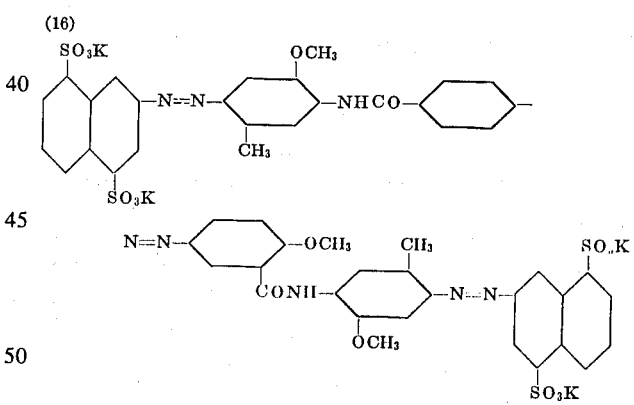

are obtained.

EXAMPLE 2

2.1. p-Aminobenzoic acid ethyl ester is diazotised in the usual manner and coupled with p-hydroxybenzoic acid methyl ester. A yellow dyestuff of melting point 123° C is obtained. The hydroxyl group of this dyestuff is methylated in the usual manner with dimethyl sulphate in acetone in the presence of potassium hydroxide. The methylation product has a melting point of 153° C after recrystallisation from 100 percent acetic acid. The ester groups are saponified with sodium hyroxide and the saponification product is crystallised from dimethylformamide. The acid has a melting point of 305° to 308° C.

4 g of this acid are suspended in 6.7 ml of toluene and after adding 3 drops of dimethylformamide are mixed with 4 g of thionyl chloride. The reaction mixture is then warmed to 100° C whilst stirring. After 10 all the material dissolves. The mixture is heated for a further 20 minutes to 100° to 105° C, a further 6.7 ml of toluene are added and the mixture is allowed to cool slowly. The product is filtered, washed with 20 ml of petroleum ether and crystallised from 30 ml of benzene. 3 g of the acid chloride of melting point 120° C are obtained.

2.2. 5.4 g of the yellow dyestuff manufactured according to 1.1. are dissolved in 44 ml of N-methylpyrrolidone at 120° C. The solution is allowed to cool to 80° C and 1.5 ml of pyridine are added. 2.5 g of the product according to 2.1. are then introduced with good stirring. The addition of the acid chloride according to 2.1. is continued until no dyestuff 1.1. can be detected chromatographically in the reaction mixture. The clear reaction solution is mixed with 150 ml of acetone, filtered, and the residue washed with 50 ml of acetone. The residue is boiled with 50 ml of methanol for 1 hour whilst stirring, filtered hot and washed three times with 20 ml of methanol each time. The residue is boiled for 1 hour with 40 ml of methanol and 6 ml of 20 percent alcoholic potassium acetate solution, filtered hot and washed four times with 10 ml of methanol each time.

2.7 g of the yellow dyestuff B of formula (17)

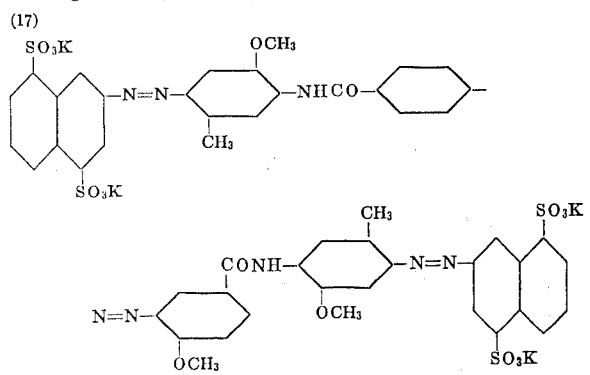

are obtained.

EXAMPLE 3

3.1. 2-Methoxyaniline-5-carboxylic acid methyl ester is diazotised in the usual manner and coupled with salicylic acid methyl ester. The resulting dyestuff is methylated with dimethyl sulphate in known manner in acetone in the presence of potassium hydroxide and the two carboxyl groups are then saponified.

3.3 g of the resulting dyestuff are suspended in 20 ml of benzene and mixed with 5 g of phosphorus pentachloride. The mixture is heated to 80° C for 1 hour, allowed to cool to room temperature, and the resulting yellow crystals are filtered, washed with 3 ml of benzene and 20 ml of petroleum ether.
Yield: 2.1 g; melting point: 165° c. C.

3.2. 8 g of the product manufactured according to 1.1. are dissolved in 60 ml of N-methylpyrrolidone and 10 ml of pyridine at 120° C then mixed at 80° C with 4 g of the product manufactured according to 3.1. The addition of the product according to 3.1. is continued until no product manufactured according to 1.1. can be detected chromatographically in the reaction solution. The reaction solution is then mixed with 300 ml of acetone, and the product is filtered and washed three times with 50 ml of acetone each time. The residue is boiled with 100 ml of methanol and 10 ml of a 20 percent solution of potassium acetate in methyl alcohol for 1 hour, filtered and washed three times with 50 ml of methanol each time.

6 g of the yellow dyestuff C of formula (18)

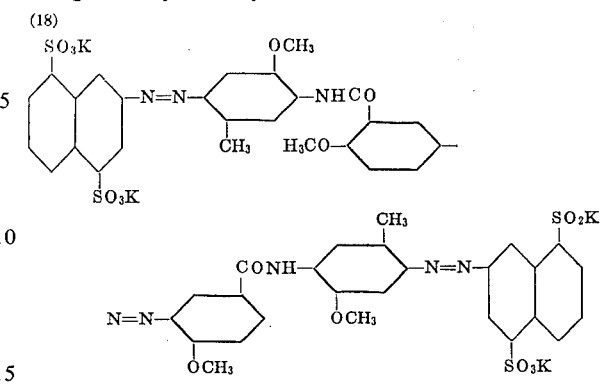

are obtained.

EXAMPLE 4

4.1. 2-Aminonaphthalene-4,8-disulphonic acid is diazotised in the usual manner and coupled with 2-β-hydroxyethoxy-5-methylaniline.

4.2. 5.5 g of the dyestuff manufactured according to 4.1. are dissolved in 44 ml of N-methylpyrrolidone at 120° C, mixed with 1.5 ml of pyridine, and 2.5 g of the product according to 1.2. are introduced into this solution at 80° C. The addition of product according to 1.2. is continued until no product according to 4.1. can be detected chromatographically in the reaction solution. The mixture is then allowed to cool slowly to room temperature and the product is filtered, rinsed with 10 ml of N-methylpyrrolidone and the residue boiled with 50 ml of alcohol for one hour whilst stirring. It is then filtered and the residue washed three times with 25 ml of alcohol each time. The residue is again boiled for 1 hour with 40 ml of methanol with the addition of 6 ml of 20 percent potassium acetate solution, filtered and washed three times with 10 ml of methanol each time.

4.6 g of the yellow dyestuff D of formula (19)

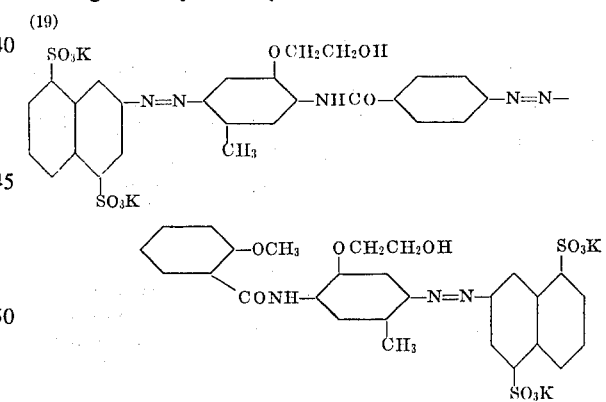

are obtained.

EXAMPLE 5

5.1. 2-Aminonaphthalene-4,8-disulphonic acid is diazotised in the usual manner and coupled with 3-n-propionylaminoaniline.

5.2. 1.0 g of the dyestuff according to 5.1. is dissolved in 20 ml of N-methylpyrrolidone at room temperature and 0.35 g of the product according to 1.2. are introduced into this solution. The addition of product according to 1.2. is continued until no product according to 5.1. can be detected chromatographically in the reaction solution. The dyestuff formed is precipitated by adding 200 ml of acetone, filtered, the residue dissolved in 50 ml of water and the dyestuff precipitated with potassium acetate, filtered and washed three times with 5 ml of methanol each time.

0.6 g of the yellow dyestuff E of formula (20)

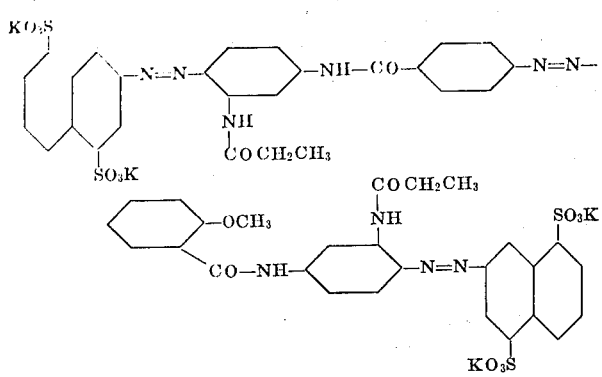

is obtained.

EXAMPLE 6

6.1. 2-Aminonaphthalene-4,8-disulphonic acid is diazotised in the usual manner and coupled with 5-chloro-2-methoxyaniline.

6.2. A procedure analogous to 5.2. is followed and 0.6 g of the yellow dyestuff F of formula (21)

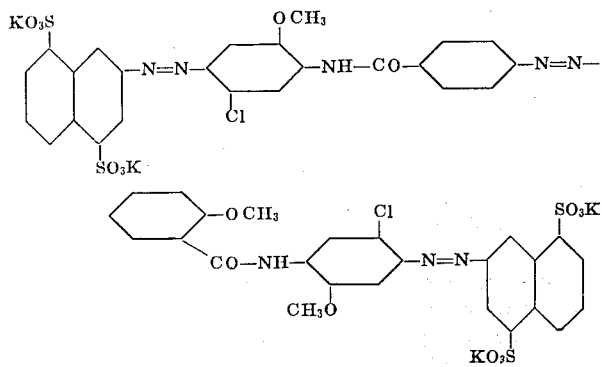

is obtained.

EXAMPLE 7

7.1. 2-Aminonaphthalene-4,8-disulphonic acid is diazotised in the usual manner and coupled with 2-methoxy-5-methylaniline.

7.2. p-Aminobenzoic acid is diazotised in the usual manner and coupled with salicylic acid.

44.8 g of the resulting dyestuff are suspended in 90 ml of benzene, and mixed with 58 ml of thionyl chloride and 11.2 ml of dimethylformamide. The mixture is heated to 55° to 60° C for 1 hour; a clear solution is produced. This is allowed to cool and hydrochloric acid gas and sulphur dioxide are removed from the reaction solution by pumping the reaction vessel to 16 mm Hg for 1 hour. The residue is stirred with a mixture of 30 ml of benzene and 70 ml of petroleum ether, filtered, pressed, washed with a mixture of 25 ml of benzene and 75 ml of petroleum ether and immediately further processed.

7.3. 7 g of the dyestuff manufactured according to 7.1. are dissolved in 70 ml of N-methylpyrrolidone and 7 ml of pyridine at 70° C and the acid chloride obtained from 7.2. is slowly added at this temperature, the progressive condensation being checked during the addition by the disappearance of the amino group which is recognisable by diazotisation and coupling in a spot test. When no further amino group can be detected, the reaction solution is stirred into 200 ml of acetone and the dyestuff which has separated is filtered and twice washed with 100 ml of acetone each time.

The residue is boiled with 50 ml of methanol and 5 ml of a 20 percent solution of potassium acetate in methyl alcohol for 10 minutes, filtered and washed three times with 50 ml of methanol at 60° C.

5 g of dyestuff G of formula (22)

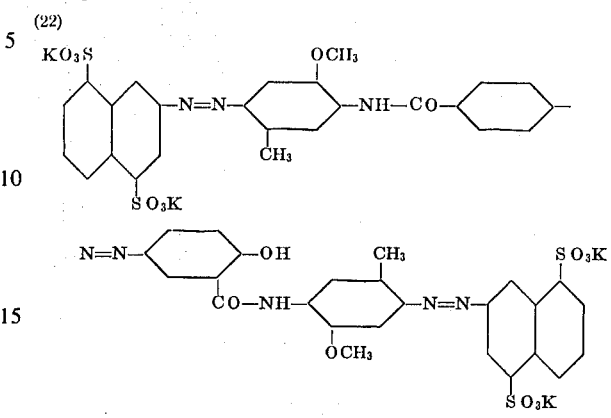

are obtained.

EXAMPLE 8

8.1. 2-Aminonaphthalene-4,8-disulphonic acid is diazotised in the usual manner and coupled with 3-succinylaminoaniline.

8.2. 3 g of finely powdered dyestuff according to 8.1. are suspended in 60 ml of N-methylpyrrolidone and 5 ml of pyridine and this suspension is mixed at 80° C with 2 g of 4-methoxy-azobenzene-3,4'-dicarboxylic acid dichloride (manufactured according to example 1.2.). Acid chloride is added until no further amino group is detectable after diazotisation and coupling in a spot test. The reaction solution is stirred into 300 ml of acetone, and the dyestuff which has separated out is filtered and washed three times with 50 ml of acetone each time. The residue is suspended in 100 ml of methanol; 2.5 ml of a 20 percent solution of potassium acetate in methyl alcohol are then added, the mixture is boiled for 15 minutes, the product is filtered hot and washed three times with 50 ml of methanol each time at 60° C.

1.6 g of the dyestuff H of formula (23)

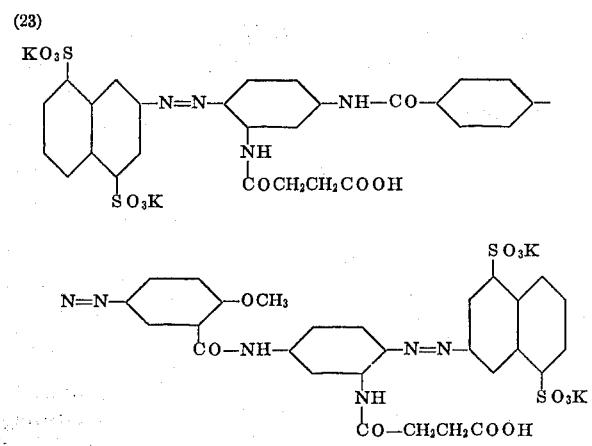

are obtained.

EXAMPLE 9

9.1. 2-Methoxyaniline-5-sulphonic acid is diazotised in known manner and coupled with 2-methoxy-5-methylaniline.

9.2. 6 g of the dyestuff according to 9.1. in 60 ml of N-methylpyrrolidone and 3 ml of pyridine are heated to 80° C and mixed with 2 g of 4-methoxyazobenzene-3,4'-dicarboxylic acid dichloride (manufactured according to example 1.2.). Acid chloride is added until no further amino group is detectable by diazotisation and coupling in a spot test.

The reaction solution is stirred into 300 ml of acetone and the dyestuff is filtered and washed three times with 50 ml of acetone each time.

The residue is suspended in 100 ml of methanol, 5 ml of a 20 percent solution of potassium acetate in methyl alcohol are added, the mixture is boiled for 15 minutes, the product is filtered hot and washed at 60° C three times with 50 ml of methanol each time.

6.1 g of the dyestuff I of formula (24)

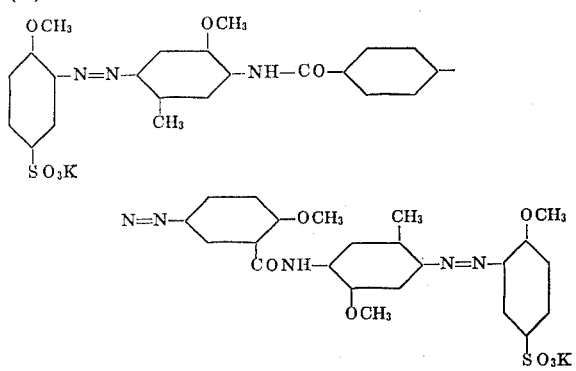

are obtained.

EXAMPLE 10

10.1. 2-Aminonaphthalene-4,8-disulphonic acid is diazotised in the usual manner and coupled with 1-aminonaphthalene.

10.2. 6 g of the dyestuff according to 10.1. are suspended in 100 ml of methylpyrrolidone and 6 ml of pyridine, heated to 80° C and mixed with 2 g of 4-methoxyazobenzene-3,4'-dicarboxylic acid dichloride (manufactured according to example 1.2.). Acid chloride is added until no further amino group is detectable by diazotisation and coupling in a spot test. The reaction solution is stirred into 800 ml of isopropanol and the product is filtered, washed with 300 ml of isopropanol and twice with 100 ml of alcohol.

The residue is suspended in 100 ml of methanol, mixed with 20 ml of a 20 percent solution of potassium acetate in methyl alcohol, the solution boiled for 15 minutes, the product is filtered hot and washed with 100 ml of methyl alcohol.

4.8 g of the dyestuff J of formula (25)

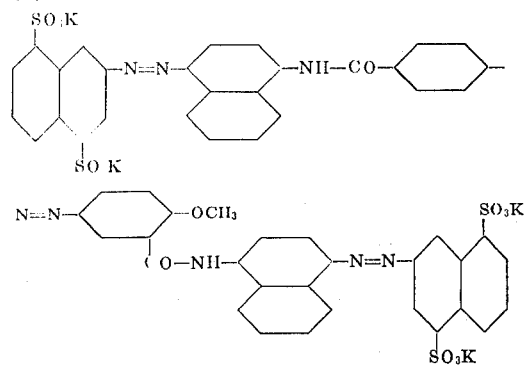

are obtained.

EXAMPLE 11

11.1. 2-Aminonaphthalene-4,8-disulphonic acid is diazotised in the usual manner and coupled with 2-methoxy-5-methylaniline.

11.2. p-Aminobenzoic acid ethyl ester is diazotised in the usual manner and coupled with 1-hydroxynaphthalene-2-carboxylic acid methyl ester.

A yellow dyestuff of melting point 181° C is obtained.

11.3. 2.6 g of the dyestuff 11.2. are introduced into a mixture of 80 ml of acetone and 2.8 g of powdered potassium hydroxide, the mixture is heated to 50° C for 30 minutes, and 4.8 ml of dimethyl sulphate are then added during 15 minutes. The mixture is boiled for 3 hours, poured on to 100 g of ice, mixed with 50 ml of 25 percent ammonia, filtered, and the residue washed with water.

2.2 g of crude product are obtained and this is recrystallised from 600 ml of alcohol and 1 g of charcoal. The resulting dyestuff has the formula (26) and melts at 138° C.

(26)

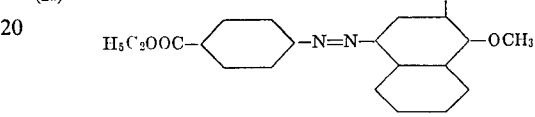

11.4. 38 g of the dyestuff according to 11.3. are boiled for 10 minutes in 200 ml of isopropanol with the addition of 30 ml of 10 n sodium hydroxide solution. The reaction solution is mixed with 1000 ml of water, rendered acid to Congo Red with hydrochloric acid, cooled to 20° C, filtered, and the residue washed with water. After drying in vacuo at 100° C the reaction product is recrystallised from dimethylformamide. Yield of compound of formula (27): 21 g, melting point 246° C.

(27)

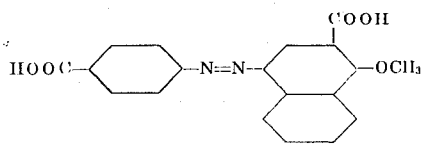

11.5. 7.5 g of the dyestuff according to 11.4. together with 30 ml of toluene, 1 ml of dimethylformamide and 8 g of thionyl chloride are heated to 100° C for 3 hours, whereupon the dyestuff dissolves completely. After cooling to 5° C the mixture is filtered and the residue washed with 5 ml of toluene and with 50 ml of petroleum ether.

6 g of the acid chloride of formula (28), of melting point 178° C, are obtained.

(28)

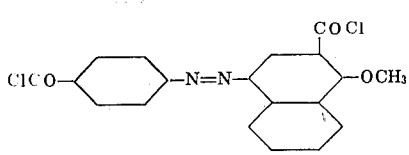

11.6. 5 g of the dyestuff manufactured according to 11.1. in 50 ml of methylpyrrolidone and 5 ml of pyridine are heated to 80° C and mixed at this temperature with 3 g of the acid chloride according to 11.5. The addition of acid chloride is continued until no further amino group is detectable by diazotisation and coupling in a spot test. The reaction solution is then cooled to 20° C, stirred into 250 ml of acetone, filtered and the residue washed with 200 ml of acetone. The residue is taken up in 100 ml of methyl alcohol, mixed with 25 ml of a 20 percent solution of potassium acetate in methyl alcohol, boiled for 15 minutes, filtered hot and washed with 100 ml of methyl alcohol.

5.2 g of the dyestuff K of formula

(29)
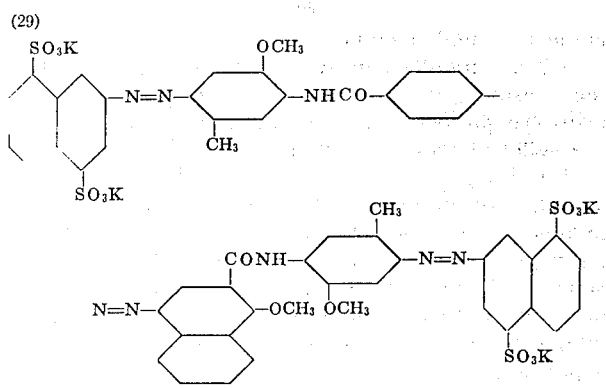

are obtained.

EXAMPLE 12

12.1. 2-Amino-6-acetylaminonaphthalene-4,8-disulphonic acid is diazotised in the usual manner and coupled with 3-succinylaminoaniline.

12.2. 3 g of finely powdered dyestuff according to 12.1. are suspended in 60 ml of N-methylpyrrolidone and 5 ml of pyridine and this suspension is mixed at 80° C with 2 g of 4-methoxyazobenzene-3,4'-dicarboxylic acid dichloride. Acid chloride is added until no further amino group is detectable by diazotisation and coupling in a spot test. The reaction solution is stirred into 300 ml of acetone, filtered and the product washed three times with 50 ml of acetone each time. The residue is suspended in 100 ml of methanol, mixed with 2.5 ml of a 20 percent solution of potassium acetate in methyl alcohol, boiled for 15 minutes, filtered hot and washed three times with 50 ml of methanol at 60° C each time.

2 g of the dyestuff of formula

(30)
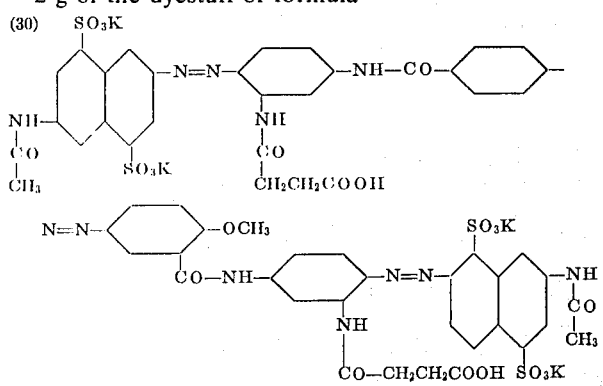

are obtained.

EXAMPLE 13

13.1. 67 g of 5-amino-1,2,4-triazole-3-carboxylic acid are suspended in 300 ml of acetic acid/propionic acid 1:1, 200 ml of 37 percent hydrochloric acid are added thereto, the mixture is cooled to 0° C and 130 ml of 4N sodium nitrite solution are added in several portions. Diazotisation is carried out for 1 hour at 0° C.

The diazonium salt solution is poured into 80 ml of salicylic acid methyl ester which have been diluted with 100 ml of methanol. The pH value is raised from 3 to 9 by dropwise addition of 650 ml of 30 percent sodium hydroxide solution. The mixture is stirred for 24 hours at 0° to 5° C. The intensely red-coloured suspension is heated to 50° C, filtered, and the residue is recrystallised from 8,000 ml of water.

Yield: 71 g = 48.8 percent of a yellow powder which decomposes above 260° C and corresponds to the formula

(31)
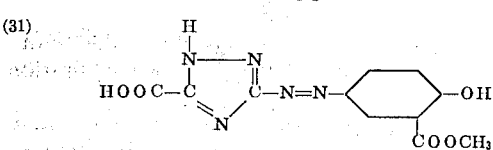

13.2. 16 g of the intermediate product of formula (31) in 50 ml of $H_2O$ and 70 ml of 1 N sodium hydroxide solution are kept for 30 minutes at 90° C. The mixture is cooled and adjusted to pH 7 with concentrated hydrochloric acid. The product is filtered and washed with a little water.
Yield: 5 g.

After crystallisation from 100 ml of ethanol 3.5 g of a pale yellow chromatographically homogeneous product remain which decomposes at 270° to 290° C and has the formula

(32)
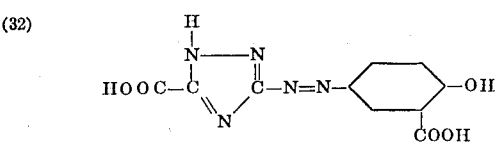

13.3. 3.8 g of the intermediate product of formula (32) in 50 ml of thionyl chloride and 1 ml of dimethylformamide are stirred for 1 hour at 50° to 55° C. Thereafter the excess thionyl chloride is evaporated in vacuo at 50° C. The acid chloride is then further processed for the manufacture of the required dyestuff.

13.4. 7 g of the coupling product from diazotised 2-aminonaphthalene-4,8-disulphonic acid and 2-methoxy-5-methylaniline are dissolved in 150 ml of N-methylpyrrolidone and directly added to the acid chloride of 13.3. After 12 hours stirring at room temperature the mixture is warmed to 60° C for 30 minutes and the dyestuff is precipitated by adding 500 ml of acetone. The precipitated dyestuff is filtered, the residue is dissolved in 30 ml of water, diluted with 300 ml of methanol, and 5 ml of 7 N potassium acetate solution are added. The product is filtered and dried in vacuo at 50° C.

Yield: 1.1 g of the orange dyestuff M of formula

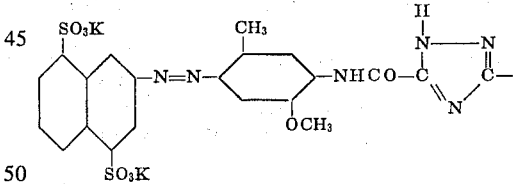

(33)
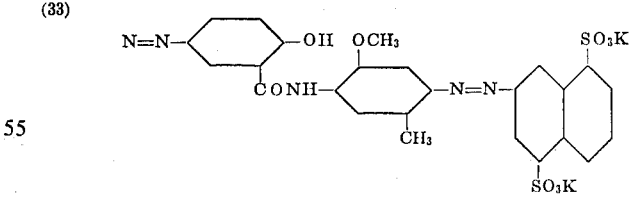

EXAMPLE 14

14.1. 12.8 g of the intermediate product of formula (31) (91 percent content) are suspended in 100 ml of dimethylformamide; 35 g of powdered potassium carbonate are then added, followed after half an hour by 19 ml of dimethyl sulphate (= 26 g). Foaming immediately starts with a slight rise in temperature. Thereafter the mixture is heated to 60° - 70° C for 5 minutes, and 100 ml of water and 2 N hydrochloric acid to give a pH of 7 are added to destroy the excess dimethyl sulphate. The reaction mixture is kept for 5 minutes at 70° C and concentrated until a thick crystal sludge is obtained which is filtered, washed with 20 ml of methanol and dried in vacuo at 50° C.
Yield: 4.5 g.

The product is purified by recrystallisation from 50 ml of ethanol and 3.5 g of a yellow product of melting point 152° to 165° C of the formula

(34)
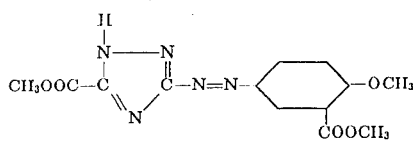

are obtained.

14.2. 3.2 g of the intermediate product of formula (34) in 40 ml of 1 N sodium hydroxide solution are heated to 90° C for 45 minutes. The mixture is then neutralised with 2 N hydrochloric acid and the precipitate is filtered. It is dried in vacuo at 50° C.
Yield: 1.4 g of a yellow powder which decomposes above 300° C having the formula

(35)
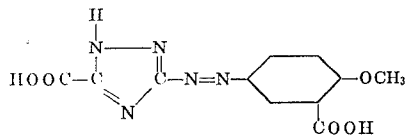

14.3. 1.2 g of the intermediate product of formula (35) in 30 ml of thionyl chloride and 1 ml of dimethylformamide are stirred for 60 minutes at 50° to 55° C. The mixture is heated to reflux temperature for a short time and the excess thionyl chloride is evaporated in vacuo. The resulting acid chloride is then further processed as follows.

14.4. 3.0 g of the coupling product from diazotised 2-aminonaphthalene-4,8-disulphonic acid and 2-methoxy-5-methylaniline are dissolved in 50 ml of N-methylpyrrolidone and directly added to the acid chloride of 14.3. After 12 hours stirring the mixture is heated to 50° C, kept for 30 minutes at this temperature and then filtered, and the filtrate is precipitated by adding 500 ml of acetone. The mixture is filtered, the residue is dissolved in 30 ml of hot water and diluted with 300 ml of ethanol, and 5 ml of 7 N potassium acetate solution are added. The product is filtered and dried in vacuo at 50° C.
Yield: 0.8 g of the yellow dyestuff N of the formula

(36)
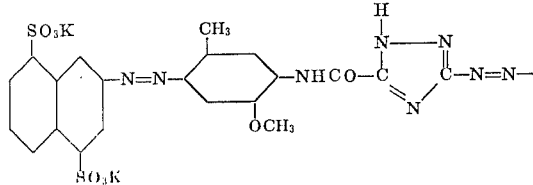
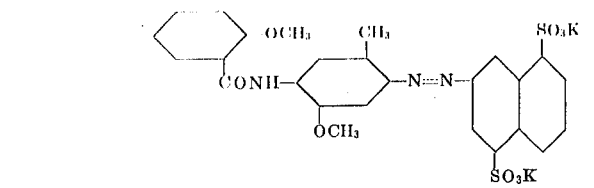

The absorption maxima of dyestuffs A to N, measured in gelatine, are listed in the table below.

| Dyestuff | Absorption maxima in nm |
|----------|-------------------------|
| A | 423 |
| B | 420 |
| C | 428 |
| D | 420 |
| E | 408 |
| F | 404 |
| G | 412 |
| H | 384 |
| I | 408 |
| J | 430 |
| K | 424 |
| L | 406 |
| M | 419 |
| N | 415 |

EXAMPLE 15

The following layers are successively applied to an opaque white acetate film provided with an adhesive layer:

1. Silver bromide emulsion in gelatine, sensitive to red, containing the greenish-blue dyestuff of formula

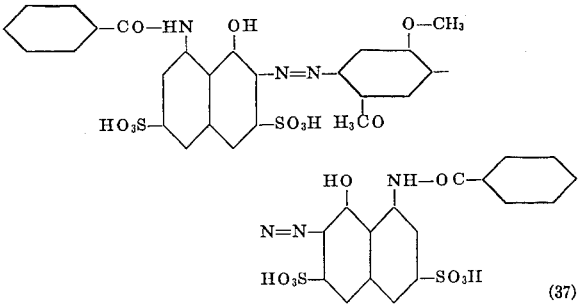
(37)

2. Colourless gelatine layer without silver halide.
3. Silver bromide emulsion in gelatine, sensitive to green, containing the magenta dyestuff of formula

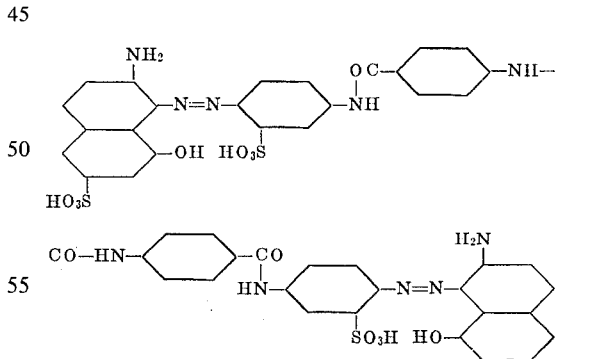
(38)

4. Yellow filter layer containing the dyestuff of formula

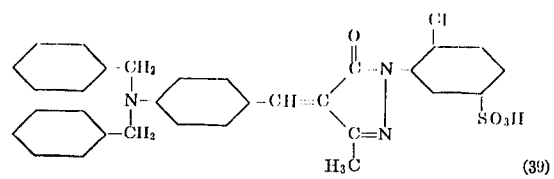
(39)

5. Silver bromide emulsion in gelatine, sensitive to blue, containing the yellow dyestuff A of formula (16).

The gelatine layers can also contain additives for example wetting agents, hardeners and stabilisers for the silver halide. In other respects the procedure followed is such that the individual layers contain 0.5 g of the particlar dyestuff and an amount of silver bromide corresponding to 1 to 1.2 g of silver per square metre of film.

This film is exposed to red, green and blue copying light under a coloured diapositive. Thereafter the copy is developed in accordance with the following instructions:
1. 6 Minutes development in a bath which in one litre of water contains 50 g of anhydrous sodium sulphate, 0.2 g of 1-phenyl-3-pyrazolidone, 6 g of hydroquinone, 35 g of anhydrous sodium carbonate, 4 g of potassium bromide and 0.3 g of benztriazole;
2. 5 minutes soaking;
3. 6 minutes fixing in a solution of 200 g of crystalline sodium thiosulphate and 20 g of potassium metabisulphite in 1 litre of water;
4. 5 minutes soaking;
5. 3 to 12 minutes colour bleaching with a solution which in one litre of water contains 50 to 80 g of potassium bromide, 40 to 80 g of thiourea, 35 to 80 g of 30 percent sulphuric acid and if desired 0.01 g of 2-amino-3-oxyphenazine;
6. 10 minutes soaking;
7. 5 minutes bleaching of residual silver with a solution of 60 g of crystalline copper sulphate, 80 g of potassium bromide and 15 ml of 30 percent hydrochloric acid per litre of water;
8. 5 minutes soaking;
9. 5 minutes fixing as specified under 3;
10. 5 minutes soaking.

The resulting positive image for viewing in reflected light is fast to slight and of the permanence required for documents.

Instead of dyestuff A, dyestuffs B to N can also be used with equally good results.

We claim:
1. A trisazo dyestuff of the formula

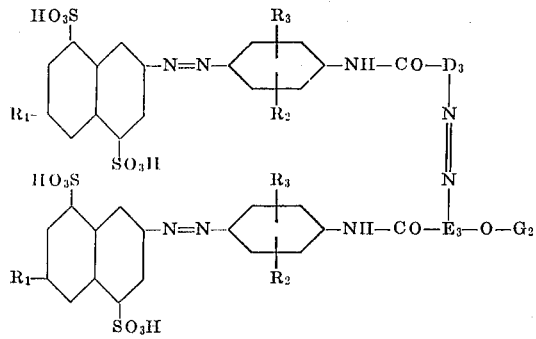

wherein $R_1$ denotes hydrogen, halogen, nitro or sulphonic acid, $R_2$ denotes hydrogen, chlorine, alkyl, alkoxy, hydroxyalkoxy, alkoxyalkoxy in each case having one to five carbon atoms in the alkyl moiety, phenoxy, hydroxyacetic acid, acetic acid or acylamino where acyl represents alkanoyl having one to five carbon atoms or of benzoyl, or carboxyacylamino which is derived from alkylene dioic acid having one to five carbon atoms, $R_3$ is hydrogen, methyl or methoxy or acylamino in which acyl has the significance given for $R_2$, $D_3$ is phenylene, naphthylene, toluylene, anisoylene or chlorophenylene, $E_3$ is phenylene, naphthylene, toluylene or anisoylene and $G_2$ is hydrogen, methyl or ethyl, the residues $D_3$ and $E_3$—$OG_2$ being different from one another.

2. A trisazo dyestuff of the formula

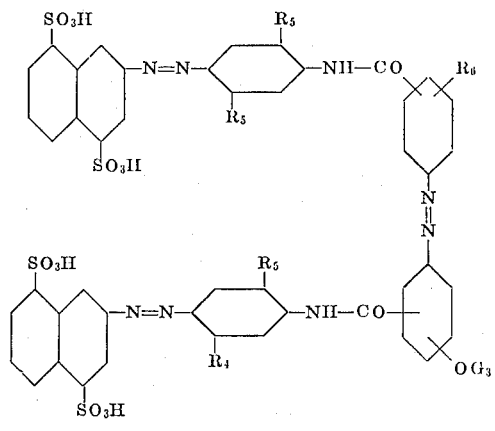

in which $R_4$ is chlorine, methyl, methoxy or acetylamino, $R_5$ is hydrogen, methyl, methoxy, ethoxy or hydroxyethoxy, $R_6$ is hydrogen, or methoxy and $G_3$ is methyl, and

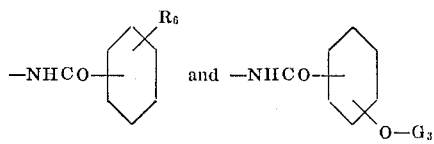

being different from one another and each NHCO being bound by -CO- to 3- or 4-position and the $G_3$—O— being bound to the benzene in the 2- or 4-position to the azo bridge.

3. A trisazo dyestuff according to claim 2 of the formula

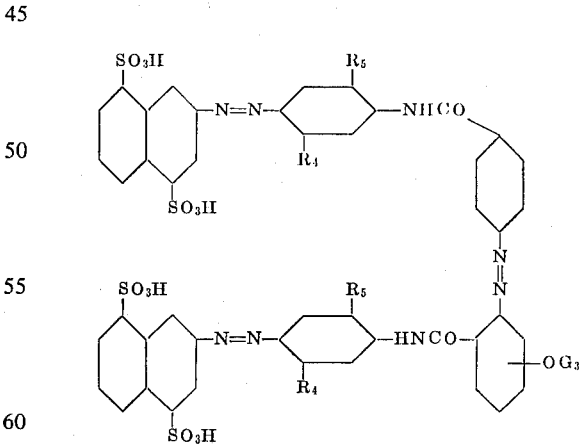

in which
$R_4$ is methyl
$R_5$ is hydroxyethoxy
$G_3$ is methyl and the group $OG_3$ is located ortho or para to the azo group

4. A dyestuff of the formula
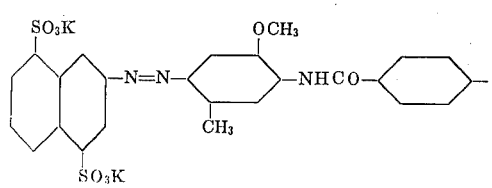
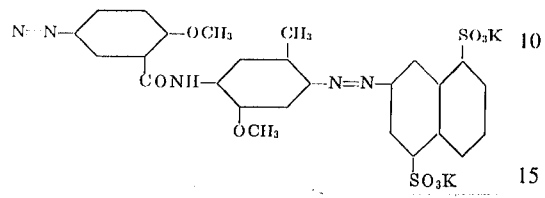
5. A dyestuff of the formula
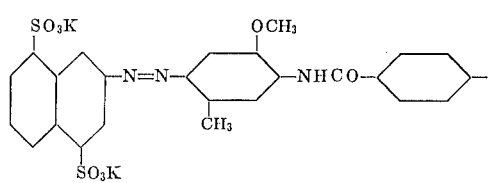
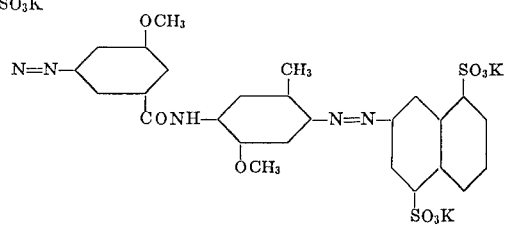
6. A dyestuff of the formula
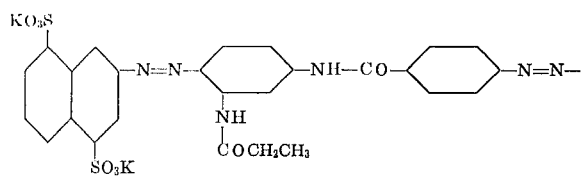
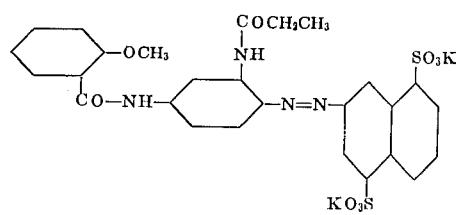
7. A dyestuff of the formula
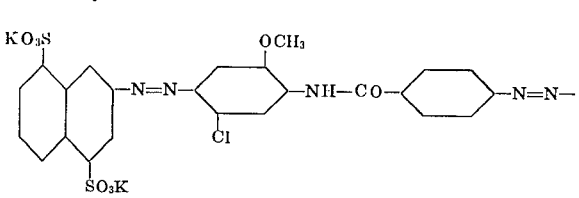
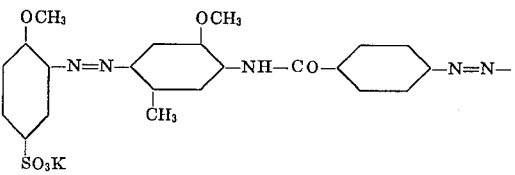
8. A dyestuff of the formula
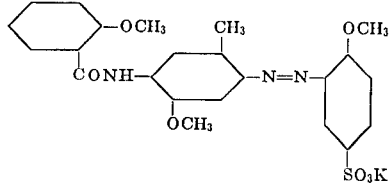
\* \* \* \* \*